UNITED STATES PATENT OFFICE.

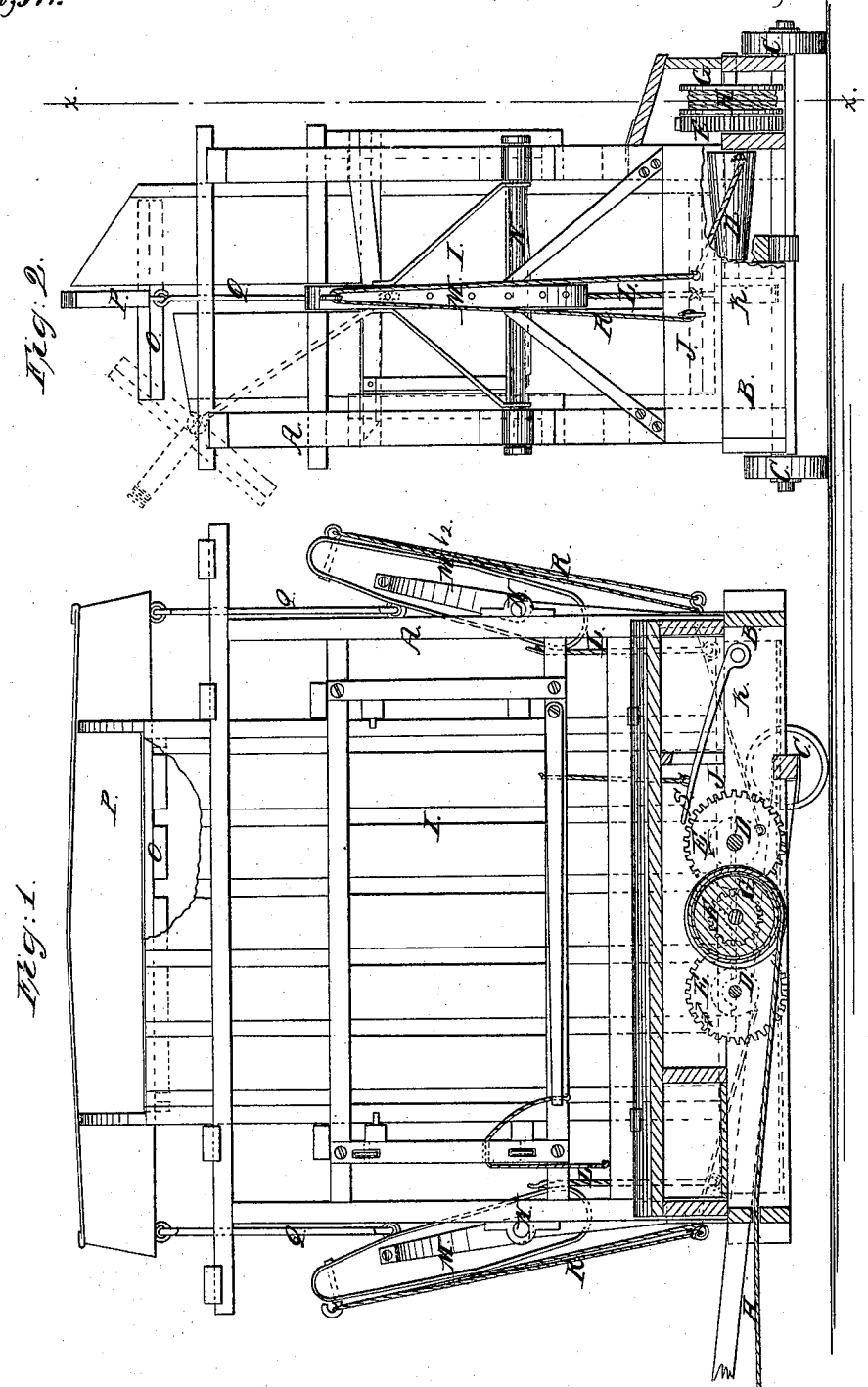

CHARLES H. THATFORD, OF JAMAICA, NEW YORK.

IMPROVEMENT IN BALING-PRESSES.

Specification forming part of Letters Patent No. 52,911, dated February 27, 1866.

*To all whom it may concern:*

Be it known that I, CHARLES H. THATFORD, of Jamaica, in the county of Queens and State of New York, have invented a new and Improved Baling-Press; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x$ $x$, Fig. 2; Fig. 2, an end view of the same.

Similar letters of reference indicate corresponding parts.

This invention relates to a new and improved baling-press of that class in which levers are employed for operating the platens; and it consists in a novel arrangement of the levers, platens, and windlasses, as hereinafter fully shown and described, whereby the labor and necessary manipulation attending the operation of baling are greatly expedited and a powerful press obtained.

A represents the frame of the baling-press, which may be constructed in any suitable manner to insure strength. This frame rests upon a base, B, which is mounted upon two wheels, C C, and is provided with a draft-pole to admit of the press being readily conveyed or drawn from place to place. These wheels are detached when the press is to be worked.

Within the base B there are placed transversely two conical rollers, D D, each having a toothed wheel, E, at one end, into both of which a pinion, F, gears, as shown by the dotted lines in Fig. 1, and on the shaft of the pinion F there is keyed a drum, G, around which a chain or rope, H, is wound.

I represents the press-box, which is securely fitted within the frame A, and has a platen, J, working in its lower part. This platen is attached to and rests upon a bar, K, the latter projecting beyond the ends of the platen, and having its ends connected, by chains or ropes L L, to the lower ends of levers M M, which are fitted loosely on shafts N N, one at each side of the frame A, the shafts N passing through the levers M near their lower ends.

O is a platen, which works in the upper part of the press-box, and has a bar, P, attached longitudinally and centrally to its upper surface, said bar P projecting beyond the ends of the platen O, and having a rod, Q, attached to it near each end, the lower ends of said rods being attached to the levers M some distance above the shafts N N, as shown clearly in Fig. 1.

To the outer ends of the long arms of the levers M there are attached eyes or pulleys $a$, through which chains or ropes R pass, the outer ends of the latter being attached to the ends of the base B, said chains or ropes also passing through the ends of the base B, and having their inner ends attached to the large ends of the conical rollers D D, as shown in Fig. 2.

The operation is as follows: When the levers M M are in an upright position, or nearly so, as shown in Fig. 1, the lower platen, J, will be fully down and the upper platen, O, will be raised to its fullest extent, and when this platen is thus raised it may be moved off laterally from the top of the press-box, as shown in red in Fig. 2, so that the press-box may be filled with the substance to be compressed. When the press-box is filled the platen O is moved over the press-box and the draft animal or team attached to the chain or rope H started, so that the shaft of the pinion F will be rotated and the conical rollers D D turned in the direction indicated by the arrows, the chains or ropes R being thereby wound upon the rollers D D, and the levers M brought down in the direction indicated by the arrows 2. This movement of the levers M raises the lower platen, J, and draws down the upper platen, O, the substance being compressed between the two platens. The platens are held during this pressing operation, or prevented from moving in a contrary direction in the event of a retrograde movement of the team, by means of a pawl, S, which engages with one of the toothed wheels, E, as shown in Fig. 1. When the substance is fully compressed the press-door is opened and the bale bound or hooped, the pawl S raised, and the horse or team backed. The gravity of the bale, in connection with its spring or elasticity, will cause the platens to move back to their original position, and when the platen O is fully raised the bound bale is removed, the press-box door closed, the platen O moved laterally off from the top of the press-box, the press-box again filed, and the platen O moved back, the pawl S lowered to engage with its wheel E, and the team or horse started for a succeeding pressing operation.

The conical form of the rollers D D, with the chains or ropes R winding upon them from their larger to their smaller ends, gives a progressive power to the press, the power gradually increasing as the platens approach each other and until this movement is completed.

It will be seen from the above description that the work or manipulation attending the operating of the press may be performed with the greatest facility and a powerful and compact press obtained.

Having thus described my invention, what I claim as new, and desire to secure by Letters Patent, is—

1. The two platens J O, connected with the levers M M, as shown, in combination with the windlass arrangement composed of the rollers D D, connected by gearing E E F, and the chains or ropes R R, attached to the levers M, and the rollers D, substantially as and for the purpose herein set forth.

2. In connection with the press, as described, the arrangement of the top platen, O, in such a manner that when said platen is fully raised it may be moved laterally off from the top of the press-box and back over the same, in order to facilitate the filling of the press-box, substantially as set forth.

CHARLES H. THATFORD.

Witnesses:
SAMUEL T. WOOLLEY,
ISAAC HENDRICKSON.